United States Patent

Dorner et al.

[11] 3,901,196
[45] Aug. 26, 1975

[54] REACTOR INSTALLATION

[75] Inventors: Heinrich Dorner, Erlangen; Eberhard Michel, Nurnberg, both of Germany

[73] Assignee: Siemens Aktiengesellschaft, Munich, Germany

[22] Filed: May 21, 1974

[21] Appl. No.: 471,894

[30] Foreign Application Priority Data

May 30, 1973  Germany............................ 2327759
Jan. 14, 1974  Germany............................ 2401610

[52] U.S. Cl................................. 122/510; 176/87
[51] Int. Cl............................................ F22b 37/24
[58] Field of Search ................ 122/32, 33, 34, 510; 176/38, 87

[56] References Cited
UNITED STATES PATENTS

| 2,201,786 | 5/1940 | Nilson............................. | 122/510 X |
| 3,192,121 | 6/1965 | Challender et al. ............ | 122/510 X |
| 3,395,076 | 7/1968 | Ruppen, Jr. .................... | 122/510 X |
| 3,413,960 | 12/1968 | Feliks et al. ..................... | 122/510 |

*Primary Examiner*—Kenneth W. Sprague
*Attorney, Agent, or Firm*—Kenyon & Kenyon Reilly Carr & Chapin

[57] ABSTRACT

A reactor installation has a pressurized-water reactor pressure vessel with its bottom fixed against downward movement and an upper portion which connects via a horizontal straight coolant-loop pipe, with the lower portion of a vertical steam generator horizontally offset from the pressure vessel and positioned at a higher level than the latter. The bottom of the steam generator is supported by a cam follower which rides on a fixedly positioned cam surface which inclines upwardly away from the pressure vessel. With varying temperatures the pressure vessel expands and contracts vertically so that its upper portion moves up and down, but the pressure vessel also radially expands and contracts and the coolant pipe does likewise in its longitudinal or axial direction, the resulting horizontal motions being transmitted via the end of the coolant pipe connected with the steam generator to the latter, the cam angularity being such that the steam generator is displaced horizontally and vertically in such a manner that the coolant pipe remains substantially horizontal and free from compressive stress other than that required to move the steam generator via the cam follower fixed to its bottom, through up and down motion on the inclined cam surface.

8 Claims, 5 Drawing Figures

REACTOR INSTALLATION

BACKGROUND OF THE INVENTION

A pressurized-water reactor installation normally includes the reactor pressure vessel containing the core and through which the coolant is circulated via a coolant loop through the heat exchanger of a steam generator. Both the pressure vessel and the steam generator have exteriors which are generally cylindrical and vertically elongated, the steam generator being taller than the pressure vessel.

When the pressure vessel is supported by having its bottom fixed against downward movement, the thermal expansion and contraction of the vessel causes its upper portion to move vertically and radially. The steam generator is normally offset from the pressure vessel and positioned at a high level via a support for the generator's bottom. A pipe line establishes a coolant loop between the upper portion of the pressure vessel and the lower portion of the steam generator, this loop comprising hot and cold legs passing the coolant to and from the steam generator's heat exchanger through hot and cold legs of the loop.

It is desirable to form the coolant loop by a single pipe internally divided by a transverse partition to form the two conduits required for the two legs, this making it most practical to make the pipe extend straight and horizontally between the pressure vessel and the steam generator.

This kind of installation presents the problem that with the coolant pipe having one end connecting with the steam generator close to the latter's supported bottom and with the pipe's other end connected with the upper portion of the pressure vessel, the vertical and radial thermal expansion and contraction motions of the vessel's upper portion, and the horizontal expansion and contraction of the coolant pipe in its longitudinal or axial direction, severe stressing of the coolant pipe and its two end connections occurs.

SUMMARY OF THE INVENTION

The object of the present invention is to provide a solution to the above problem.

According to the present invention, this solution is to make the support for the steam generator's bottom in the form of a fixedly positioned cam surface which inclines upwardly away from the vessel, and with a cam follower for this cam surface and which is fixed to the generator's bottom. Thus, the generator is supported via the cam follower and cam surface. With this arrangement the inclined angularity of the cam surface may be designed so that the steam generator moves towards and from the pressure vessel to accommodate or compensate fo the vessel's thermally induced radial motions of its upper portion and for the pipe's longitudinal or axial thermal expansion, while at the same time, the steam generator is moved in a vertical direction by the same horizontal movements to accommodate or compensate for the pressure vessel's thermally induced vertical motions of its upper portion with which the coolant pipe connects.

The coolant pipe transmits thrust to the steam generator to accomplish the above and must connect with the steam generator's lower portion at a level above the generator's support bottom, introducing a tilting moment or force to the steam generator. To overcome this, the new support arrangement may be offset from the vertical axis of the steam generator in the direction of thrust or, in other words, in a direction away from the pressure vessel.

Two of the described supports may be used, positioned symmetrically on opposite sides of the steam generator's vertical axis and in a plane at right angles to the axis of the coolant pipe. Also, the cam follower is preferably formed or provided with an anti-friction rolling element or elements as to each support. For example, the support may comprise what is, in effect, an inclined linear anti-friction bearing comprising two linear inclined surfaces between which rolling elements, such as rollers or balls, transmit the thrust of the generator's weight and such as may be involved by the generator's compensating motions. In such an instance, the inclined cam surfaces or the two surfaces with the anti-friction bearing elements between them, may have their longitudinal axes positioned so that they form in vertical planes, surfaces which converge in directions towards the pipe's axis or the pressure vessel. With this arrangement, the pipe's axis should, of course, intersect the generator's vertical axis.

The angularity of the above convergence is relatively small, relative to the axis of the coolant pipe. It should be designed so that the radial thermal expansion and contraction of the steam generator itslef is itself into account, the convergence generating a motion transversely to the axis of the pipe line. When using anti-friction bearing rolling elements in the construction of two supports transversely aligned relative to the pipe's axis and positioned necessarily close to the periphery of the steam generator, the convergence reduces or eliminates transverse thrust on the two bearings relative to their inclined cam surfaces. This is of importance because the two supports must carry the very substantial weight of the steam generator via such anti-friction elements and these elements should, therefore, run as closely as possible through linear paths.

BRIEF DESCRIPTION OF THE DRAWINGS

The presently preferred mode for carrying out the invention is schematically illustrated by the accompanying drawing, in which:

FIG. 2 is an enlargement taken from FIG. 1 showing in detail one of the supports previously referred to;

DETAILED DESCRIPTION OF THE INVENTION

Figure 1:
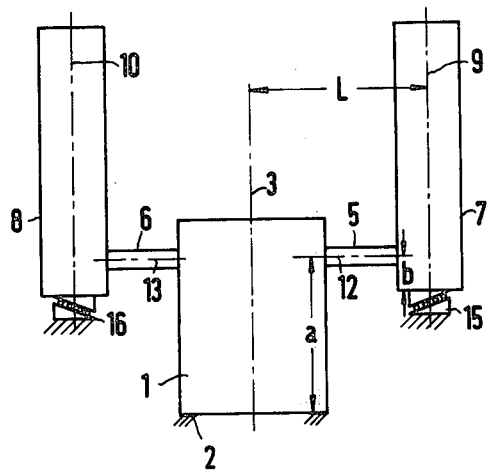
FIG. 1 shows an installation of the type previously referred to, in vertical elevation.

Having reference to the accompanying drawings, and referring first to FIG. 1, the substantially cylindrical and vertically elongated pressurized-water reactor pressure vessel is shown at 1 with its bottom fixed against downward movement by the usual support ring 2 which, although not shown, is supported by the concrete of the usual biological shielding construction surrounding the side and bottom of the pressure vessel. The longitudinal or vertical axis of this vessel is indicated by the broken line indicated at 3. The support 2 is, of course, on a horizontal plane.

Horizontal pipes 5 and 6 connect the upper portion of the pressure vessel 1 with the lower portions of steam generators 7 and 8, the vertical axes of the steam generators being indicated by the broken lines 9 and 10. Each of the coolant pipes 5 and 6 is internally divided by a longitudinally extending transverse partition (not shown) to form the hot and cold legs of each of the coolant loops which respectively connect the pressure vessel 1 with the steam generators 7 and 8.

The axes 12 and 13 of the coolant pipes 5 and 6, respectively, are located a distance a above the supports 2 which fixedly hold the vessel's bottom against downward motion. The bottoms of the steam generators 7 and 8 are supported by supports 15 and 16, respectively, and the two axes 12 and 13, which extend horizontally in alignment with each other, are located a distance b above these supports 15 and 16, in each instance. These supports 15 and 16 respectively support the weight of the generators 7 and 8.

As previously noted, the supports 15 and 16 are at a level substantially above that of the support 2 of the pressure vessel, and each steam generator is horizontally offset from the vessel 1.

The pipes 5 and 6, respectively, connect with the upper portion of the vessel 1 and with the lower portions of the steam generators.

Figure 2:
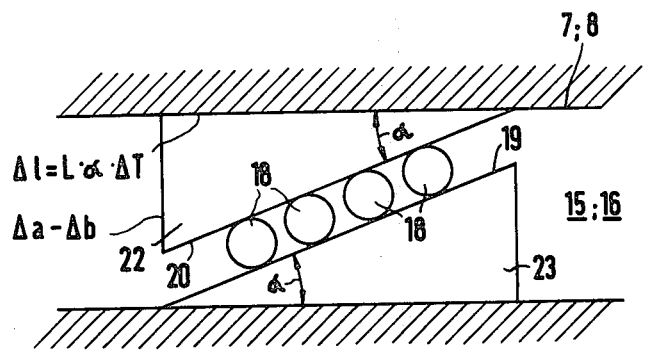

Each of the supports is constructed as shown by FIG. 2 which is on an enlarged scale. Although sliding inclined linear bearings may be used, in this instance, as to each steam generator, the weight of the generator is carried on anti-friction rolling elements as indicated by the rollers 18, these running on the inclined cam surface 19 and supporting the generator weight via an inclined surface 20 provided by the cam follower 22 which is rigidly fixed to the bottom of the generator involved. The inclination of the cam surface 19 and of the follower surface 20 are identical. As can be seen from FIG. 1, the upward inclination of the two surfaces of what is, in effect, either a cam and follower, or an upwardly inclined linear anti-friction bearing, is upwardly and away from the vessel 1.

The angle of inclination $\alpha$ is given or fixed or designed in accordance with the ratio of the thermal expansions in the longitudinal directions of the axes 3 and 9, in the case of the generator 7, for example, and transversely thereto; that is to say, in the direction of the axis 12. The transversal or horizontal elongation $\Delta l$ is here equal to the product of the distance $l$ and the specific coefficient of thermal expansion of the material used for the pipe line 5 and for the pressure vessel 1 as well as for the steam generator 7, and the temperature difference $\Delta T$. The orthogonal thermal elongation in the vertical direction is given by the difference between the thermal elongation over the distance $a$ and the thermal elongation over the distance $b$, which are both obtained as the product of the distances $a$ and $b$, respectively, and the thermal expansion coefficients and the temperature differences. Simplified, i.e., under the assumption of equal thermal expansion coefficients and equal temperatures, the angle of inclination $\alpha$ is determined by the ratio of the height difference $(a-b)$ between the supports 2 and 15 or 16 to the length of the pipe lines 5 and 6, which is essentially equal to the distance L. With the usual dimensions of the coolant loop of present-day pressurized-water reactor nuclear power plants for about 700 MWe, the angle of inclination $\alpha$ is 21°.

With the inclined plane according to the invention, the steam generators 7 and 8 are pushed away from the pressure vessel not only radially during the warming up of the nuclear reactor plant from, for instance, room temperature (20°C) to the operating temperature (300° to 350°C), but are at the same time lifted. The lifting prevents the expanding pipe lines 5 and 6 from being bent. The force required in the pipe lines 5 and 6 for moving the steam generators results at the same time in a relief, as it counteracts the tension stress which is caused by the internal pressure in the system.

Figure 3:
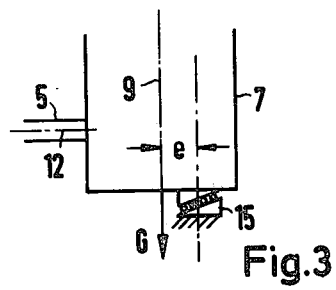
FIG. 3 shows the support offset away from the pressure vessel, again as previously mentioned.

The force required for lifting the steam generators and, as the case may be, the force for overcoming the friction, generate at the steam generators 7 and 8, a tilting moment, as the axes 12, 13 of the pipe lines 5 and 6 are situated above the supports 15 and 16 by the dimension $b$. For compensation, the supports 15 and 16 can be arranged off-center with respect to the steam generator axes 9 and 10, as shown simplified for the steam generator 7 in FIG. 3. The weight of the steam genertor, indicated by the arrow G, then provides, with the lever arm $e$ of the eccentricity of the support 15, the compensating countermoment. In the pressurized-water reactor cited as an example, the eccentricity is 0.89 m.

Figure 4:
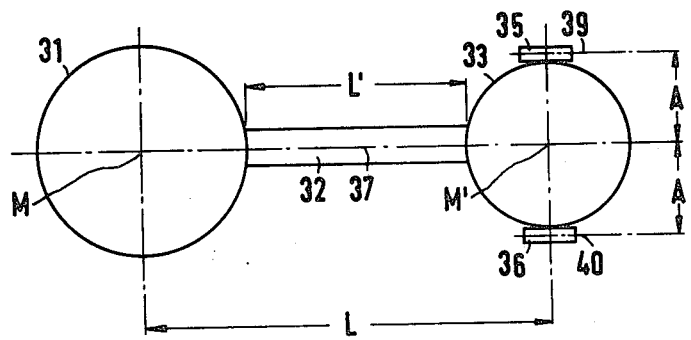
FIG. 4 is a plan view of the installation showing the use of two of the supports.

In FIG. 4, the reactor pressure vessel 31 of a pressurized-water reactor is shown in top view, which feeds a steam generator 33 via a straight pipe line 32. The pipe line 32 is divided by an internal partition, not shown in the figure, so that it allows conduction of the water heated in the reactor pressure vessel to the steam generator 33, as well as the return of the water cooled off therein to the reactor pressure vessel 31.

The steam generator 33 is provided with two supports 35 and 36. These are located, as shown in FIG. 4, symmetrically to the axis 37, indicated by a dash-dotted line, of the pipe line 32 on opposite sides. Their distance A from the axis 37 is in each case 1.80 m. The supports 35 and 36 are made as inclined planes. Their lines of steepest descent, which are indicated by the dash-dotted straight lines 39 and 40, however, do not run parallel to the axis 37.

Figure 5:
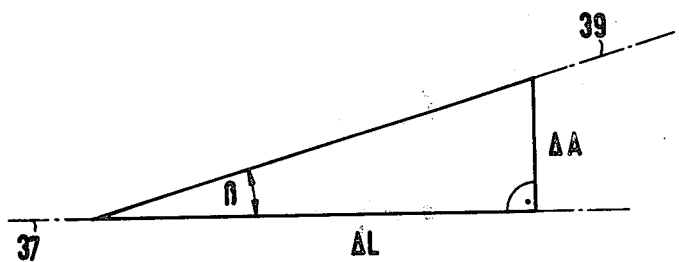
FIG. 5 schematically indicates the converging angularity of the cam surface of one of the supports illustrated by FIG. 4.

As may be seen clearly from the exaggerated illustration of FIG. 5, the vertical projections of the lines of steepest descent 39 and 40 enclose likewise an acute angle $\beta$ with the projection of the tube axis 37. The tangent of this angle is given by the ratio of the length changes of the distance A between the support 35, 36 and the axis 37 of the pipe line 32 to the length change of the pipe line. The length is designated in FIG. 4 with L. As will be seen, it covers the distance between the center M of the reactor pressure vessel 31 and the center M' of the steam generator 33. It is assumed here that the pipe line 32 proper with the somewhat smaller length L' expands, when heated up, with the same coefficient of expansion as the reactor pressure vessel and the steam generator. Within the accuracy required, this assumption is permissible. If the length L' is sufficiently large as compared to the diameters of the reactor pressure vessel 31 and the steam generator 33, one can reckon with sufficient accuracy with the length L' instead of L.

The acute angle $\beta$, which is shown exaggerated in FIG. 5, must therefore be determined as the tangent, i.e., as the ratio of the length changes $\Delta A$ to $\Delta L$. $\Delta L$ is 50 mm in the present case, while $\Delta A$ is 7 mm for the distance mentioned. From this, an angle $\beta$ of 8+ is obtained.

The angle $\beta$ of 8° is the maximally possible angle. For the case that the steam generator includes parts, e.g., plates which assume temperatures lower than the coolant circulating in the steam generator, smaller thermal expansions are obtained. For this reason, a smaller angle of 5° to 6° is chosen.

In general, it can be seen from the foregoing that with either one or two of the inclined cams or cam surfaces supporting either of the generators, that the angle of inclination may be designed so that when the pressure vessel's upper portion with which each of the coolant pipes connects, moves upwardly due to expansion between it and the vessel's fixedly positioned bottom, that the radial expansion of the vessel and the longitudinal expansion of the coolant pipe are transmitted via the coolant pipe to the steam generator involved, the latter then moving both away from the vessel under the thrust of the pipe and as required to relieve the latter from excessive compression, while at the same time the generator moves upwardly on the inclined cam or cams in the portion to the vertical movement of the vessel's upper portion resulting from its thermal expansion between its upper portion and its fixedly positioned bottom. The reverse occurs with thermal contraction movements. In case two of the supports are used for each generator, symmetrically positioned transversely on opposite sides of the coolant pipe's axis and the steam generator's vertical axis, and with the steam generator comprising substantially a cylindrical shape, the horizontal radial expansion and contraction of the steam generator can be accommodated by the convergence in a vertical plane of the two cam surfaces of the two supports involved, thus permitting the use of anti-friction rolling elements in arrangements permitting these elements to run freely.

What is claimed is:

1. A reactor installation comprising a vertical reactor pressure vessel having a bottom fixed against downward movement and an upper portion, a vertical steam generator horizontally offset from said vessel and having a lower portion substantially at the level of the vessel's said upper portion and a bottom, a support for the generator's said bottom, and a substantially straight and horizontal coolant pipe having a first end fixed to the vessel's said upper portion and a second end fixed to the generator's said lower portion; wherein the improvement comprises said support comprising a fixedly positioned cam surface which inclines upwardly away from said vessel, and a cam follower for said cam surface and which is fixed to the generator's said bottom.

2. The installation of claim 1 in which the incline angularity of said cam surface is determined substantially by the ratio of the distance between the pressure vessel's said bottom and the axis of said pipe, to the length of said pipe.

3. The installation of claim 2 in which said incline angularity is from 15° to 25°.

4. The installation of claim 1 in which at least one anti-friction rolling element supports said cam follower on said cam surface.

5. The installation of claim 1 in which said support is offset from the vertical axis of said generator in a direction away from said vessel.

6. The installation of claim 1 in which two of said supports are provided for the generator's said bottom and said two supports are symmetrically spaced on either side of the axis of said pipe and with respect to the vertical axis of said generator, and the longitudinal axes of the said cam surfaces of said two supports in vertical planes converge towards the pipe's axis in a direction towards said vessel, said pipe's axis intersecting said generator's vertical axis.

7. The installation of claim 6 in which the angle at which said cam axes converge is about from 5° to 6° with respect to said pipe's axis.

8. The installation of claim 6 in which said followers of said two supports, have anti-friction rolling element on which they are supported on said cam surfaces of said two supports.

* * * * *

UNITED STATES PATENT AND TRADEMARK OFFICE
CERTIFICATE OF CORRECTION

PATENT NO. : 3,901,196
DATED : August 26, 1975
INVENTOR(S) : Heinrich Dorner et al It is certified that error appears in the above-identified patent and that said Letters Patent are hereby corrected as shown below:

in column 2, line 26, change "itself is itself into account to --itself is taken into account-- in column 4, line 21, change "steam genertor" to --steam generator-- in column 5, line 1, change "$\beta$ of $8^+$" to --$\beta$ of $8°$--

Signed and Sealed this thirtieth Day of December 1975

[SEAL]

Attest:

RUTH C. MASON
*Attesting Officer*

C. MARSHALL DANN
*Commissioner of Patents and Trademarks*